United States Patent
Duan et al.

(10) Patent No.: US 10,339,135 B2
(45) Date of Patent: Jul. 2, 2019

(54) QUERY HANDLING IN SEARCH SYSTEMS

(71) Applicant: INTERNATIONAL BUSINESS MACHINES CORPORATION, Armonk, NY (US)

(72) Inventors: Dongxu Duan, Beijing (CN); Zhili Guo, Beijing (CN); Zhong Su, Beijing (CN); Li Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 773 days.

(21) Appl. No.: 14/935,118

(22) Filed: Nov. 6, 2015

(65) Prior Publication Data
US 2017/0132275 A1  May 11, 2017

(51) Int. Cl.
G06N 7/00 (2006.01)
G06F 16/242 (2019.01)
G06F 16/248 (2019.01)
G06F 16/2453 (2019.01)

(52) U.S. Cl.
CPC ........ *G06F 16/2425* (2019.01); *G06F 16/248* (2019.01); *G06F 16/24534* (2019.01); *G06N 7/005* (2013.01)

(58) Field of Classification Search
CPC combination set(s) only.
See application file for complete search history.

(56) References Cited

U.S. PATENT DOCUMENTS

| 7,152,064 | B2 * | 12/2006 | Bourdoncle | G06F 16/954 |
| 7,349,895 | B2 * | 3/2008 | Liu | G06F 16/58 |
| 7,664,734 | B2 * | 2/2010 | Lawrence | G06F 17/2229 707/767 |
| 7,805,288 | B2 * | 9/2010 | Guo | G06F 17/30731 704/1 |
| 8,108,439 | B2 * | 1/2012 | Guo | G06F 17/30017 707/802 |
| 8,161,059 | B2 * | 4/2012 | Guo | G06Q 30/02 707/758 |
| 8,458,213 | B2 | 6/2013 | Edmonds et al. | |
| 8,589,448 | B2 * | 11/2013 | Guo | G06F 17/30017 707/802 |
| 8,880,547 | B1 | 11/2014 | Mills et al. | |
| 8,954,422 | B2 | 2/2015 | Hasan et al. | |

(Continued)

OTHER PUBLICATIONS

ScienceDirect Elsevier Journal of Web Semantics vol. 7, Issue 3, Sep. 2009, pp. 166-176 From keywords to semantic queries—Incremental query construction on the semantic web Gideon Zenz, Xuan Zhou, Enrico Minack, Wolf Siberski, Wolfgang Nejdl.*

(Continued)

*Primary Examiner* — Michael B Holmes
(74) *Attorney, Agent, or Firm* — Tutunjian & Bitetto, P.C.; Grant Johnson

(57) ABSTRACT

Methods and systems for handling queries include extracting keywords related to a first query from one or more information sources. The keywords are classified according to a plurality of categories defined by a query schema. A plurality of the keywords are combined into a second query according to the query schema. The second query is executed to generate one or more results.

20 Claims, 3 Drawing Sheets

(56) References Cited

U.S. PATENT DOCUMENTS

| | | | |
|---|---|---|---|
| 8,983,926 B2* | 3/2015 | Cai | G06F 17/30946 |
| | | | 707/706 |
| 9,230,040 B2* | 1/2016 | Shukla | G06F 16/93 |
| 9,852,133 B2* | 12/2017 | Shukla | G06F 16/93 |
| 2004/0205044 A1* | 10/2004 | Su | G06F 17/30622 |
| 2009/0192996 A1* | 7/2009 | Guo | G06Q 30/02 |
| 2011/0131485 A1* | 6/2011 | Bao | G06Q 30/02 |
| | | | 715/243 |
| 2012/0084299 A1* | 4/2012 | Cai | G06F 19/705 |
| | | | 707/748 |
| 2013/0110806 A1* | 5/2013 | Cai | G06F 17/30864 |
| | | | 707/706 |
| 2014/0025701 A1 | 1/2014 | Zhu et al. | |
| 2014/0280047 A1* | 9/2014 | Shukla | G06F 16/93 |
| | | | 707/722 |
| 2014/0337372 A1* | 11/2014 | Lee | G06F 8/30 |
| | | | 707/767 |
| 2014/0351281 A1* | 11/2014 | Tunstall-Pedoe | G06N 5/02 |
| | | | 707/760 |
| 2015/0356463 A1* | 12/2015 | Overell | G06F 17/278 |
| | | | 706/12 |
| 2016/0117320 A1* | 4/2016 | Shukla | G06F 16/93 |
| | | | 707/722 |
| 2017/0132275 A1* | 5/2017 | Duan | G06F 16/2425 |

OTHER PUBLICATIONS

ScienceDirect Elsevier Information Systems vol. 37, Issue 4, Jun. 2012, pp. 294-305 An ontology-based retrieval system using semantic indexing Soner Kara, Özgür Alan, Orkunt Sabuncu, Samet Akpinar, Nihan K. Cicekli, Ferda N. Alpaslan.*

ACM Digital Library A hybrid approach for searching in the semantic web Cristiano Rocha Daniel Schwabe Marcus Poggi Aragao Proceeding WWW '04 Proceedings of the 13th international conference on World Wide Web pp. 374-383 May 17-20, 2004.*

The VLDB Journal Dec. 2001, vol. 10, Issue 4, pp. 334-350| Erhard Rahm, Philip A. Bernstein.*

Josh Forman-Gornall, Building a Search Engine for E-Commerce with Elasticsearch, Jan. 27, 2015, pp. 1-14.

Michael Sarrow, Improve the Use of Your Site Search Tool for eCommerce, Jul. 30, 2014.

* cited by examiner

QUERY HANDLING IN SEARCH SYSTEMS

BACKGROUND

Technical Field

The present invention relates to search query processing and, in particular, to handling queries that return no result.

Description of the Related Art

Search queries in, for example, e-commerce settings, frequently return no result (i.e., an empty result) for many searches. Receiving no result can be very frustrating for a user, reducing turnover and potentially driving the user to a competitor's service. In addition, manually rewriting a query (particularly if it is at all complicated) can be time consuming and error-prone.

In particular, users often attempt to search for very specific things (e.g., a specific brand and model of an appliance on an e-commerce website). These queries can be long and difficult to remember. Product identifiers may have very unintuitive names, such as, "xqg70-wm10e1681w," for example to represent a manufacturer's product designation, and these may differ by very small degrees from similar products—often there is no intuitive mapping between the product identifier and the name of the product. However, such product identifiers are frequently used for, e.g., comparison shopping between different sites, where the customer copies the product information from one site to another for price comparison.

One difficulty is that the product specifications are not always the same between sites, for example where the same product may have a different character sequence as the product identifier. In one specific example of this case, essentially the same product may be available on a different site, having the same functions and features, but may be deemed to be a different product by the manufacturer due to a minor variation in, e.g., color. This could result in no result to the query, and it is difficult to know whether that failure is due to a difference in product specification or because the second site does not actually carry the product.

SUMMARY

A method for handling queries includes extracting keywords related to a first query from one or more information sources. The keywords are classified according to a plurality of categories defined by a query schema. A plurality of the keywords are combined into a second query according to the query schema. The second query is executed to generate one or more results.

A method for handling queries includes extracting keywords related to a first query from one or more information sources. The keywords are weighted in accordance with a respective weight associated with each information source. The keywords are classified according to a plurality of categories defined by a query schema. A plurality of the keywords are combined into a second query according to the query schema. The second query is executed to generate one or more results. Combining the plurality of keywords into a second query includes forming a plurality of candidate queries. A probability for each of the keywords and a conditional probability for respective bigrams of keywords are calculated. Each of the calculated probabilities are multiplied together to determine an overall probability for each of the candidate queries. A candidate query having a highest overall probability is selected as the second query.

A query handling system includes a new query module comprising a processor configured to extract keywords related to a first query from one or more information sources, to classify the keywords according to a plurality of categories defined by a query schema, to combine a plurality of the keywords into a second query according to the query schema. A query execution module is configured to execute the second query to generate one or more results.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present principles leverage internal knowledge about correspondences between search terms as well as external knowledge from the internet. To accomplish this, the present embodiments consider whether there are known correspondences between a failed (i.e., "no result") query and an eventual successful query. These correspondences are stored in a local database and may be executed immediately if such a correspondence exists. If not, the present embodiments construct a new query, based on external information sources, that is more likely to generate productive results.

A user's search session may include multiple individual search queries that reflect the user's attempts to hone in on the information they seek. If an individual query produces the desired result, that is referred to herein as a "success" query. If an individual query provides no result, that is referred to herein as a "no result" query. If the final query in a session is a success query, then the session as a whole is a "success" session, because the user has located the information that they sought. The present embodiments leverage historical search information and external sources to automatically alter a user's query to provide a superior result.

Figure 1:
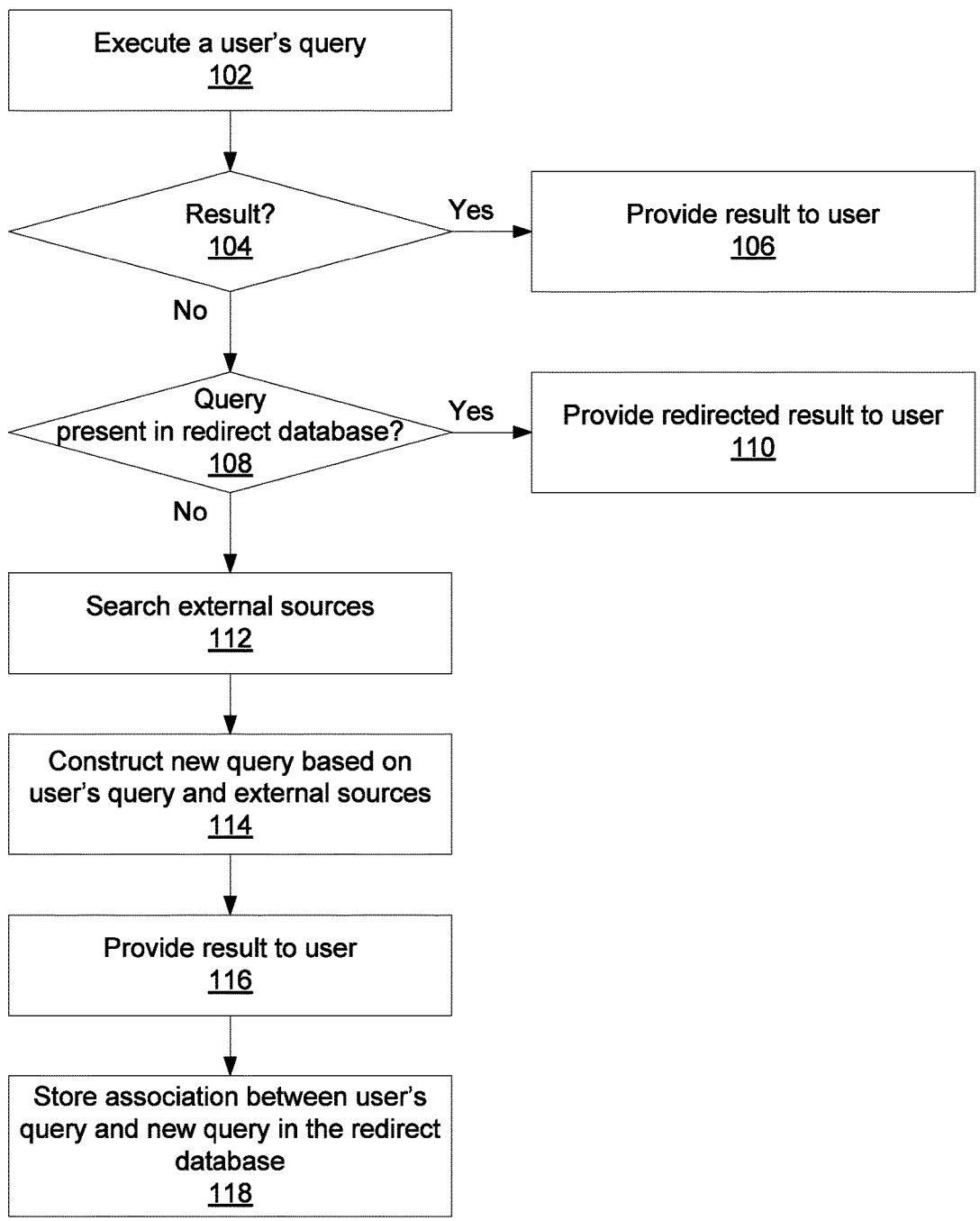
FIG. 1 is a block/flow diagram showing a method of handling a user's query in accordance with the present principles.

Referring now to the drawings in which like numerals represent the same or similar elements and initially to FIG. 1, a method for performing a user's search query is shown. Block 102 executes the user's query on the local search engine and block 104 determines whether the query produced a success or no result. If the query was a success, block 106 provides the result to the user. In this case, processing ends immediately as there is no need for additional information.

Otherwise, block 108 determines whether the query is present in a redirect database. The redirect database stores associations between no result queries and corresponding success queries. If the no result query is, for example, the product identifier "abc-12345", the redirect database may have an entry for "abc-12345" that associates the query with a different query (e.g., "NoBrand washing machine") that has been successful in the past. If such an entry exists, then block 110 provides the redirected result to the user. The redirect database may be formed from previously attempted no result queries that have been converted, by the present embodiments, to success queries. The redirect database may also include correspondences provided directly by manufacturers and sellers, establishing correspondences that they are aware of between product identifiers.

If no such entry is present in the redirect database, block 112 searches external sources for information regarding the query. This may be performed using, e.g., a conventional search engine, product databases, news sources, and other publicly available information sources. Block 114 uses the user's query and the information gleaned from the external sources to construct a new, successful query. Block 116 then provides the result to the user and block 118 stores the association between the user's query and the new query in the redirect database.

Figure 2:
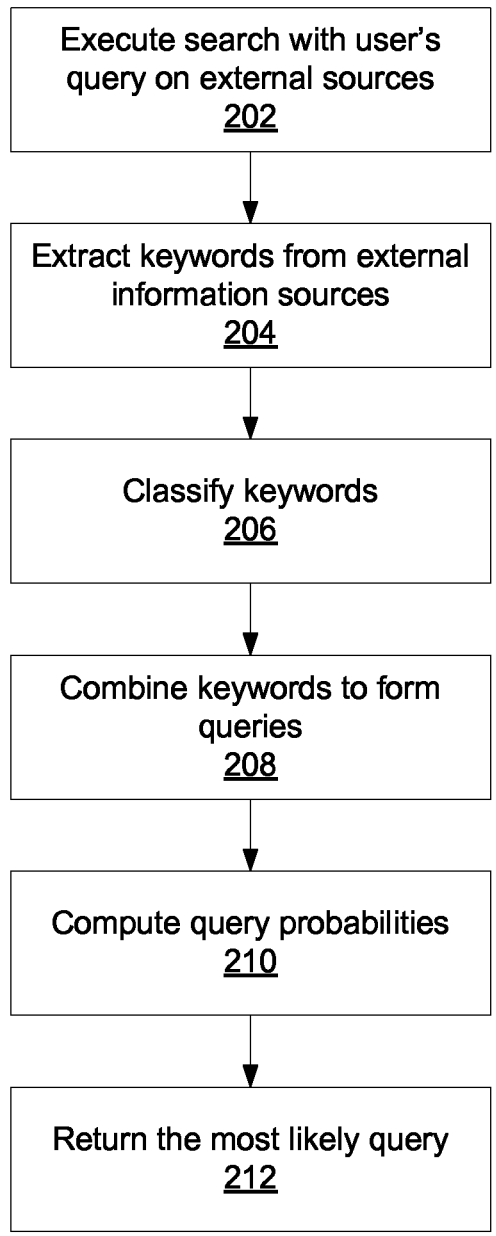
FIG. 2 is a block/flow diagram showing a method of forming an improved query based on a user's query in accordance with the present principles.

Referring now to FIG. 2, a method of forming a new query is shown, corresponding to block 114 of FIG. 1. Block 202 executes the user's query as a search term in one or more external sources, while block 204 extracts keywords from external information sources. In the operation of block 204, information from different sources may be weighted differently. For example, information gleaned from a manufacturer's website may be more highly weighted, while information from product reviews on a blog may be less highly weighted. The result of blocks 202 and 204 is a list of weighted keywords associated with the query.

Block 206 classifies the keywords. Exemplary categories may include "Brand," "Catalog," and, "Attribute," where "Brand" refers to the manufacturer or source of a product, "Catalog" provides information regarding what type of product it is (e.g., refrigerator, washing machine, air conditioner, etc.), and "Attribute" provides specific details regarding the product (e.g., "energy efficient," "low-noise," "variable frequency," etc.). Different categories may be employed for different types of searches, and the number and type of each category are structured according to a schema that guides how the categories are combined.

Multiple keywords are combined into a single query in block 208. Block 208 may form multiple new queries in this fashion. The new query is formed according to the schema, which may have an exemplary form of: <brand, catalog, attribute1, attribute2>. The schema defines query structure and is specified in terms of number and type of keyword/category. In some schemas, a relationship between keywords may also be defined, for example if the keywords have a specific positional relationship with one another in the result. Other query forms may be used instead, and indeed multiple different forms may be generated simultaneously. It is contemplated that the category breakdown will depend on the nature of the query. For example, while the above structure would be satisfactory for queries relating to appliances, it might not be suitable for queries relating to services or other types of information. It is believed that those having ordinary skill in the art will be able to construct a schema or schemas that reflect the needs of their particular application.

Block 210 then evaluates a probability for each of the generated queries. The probability computation is based on probabilities of each "unigram" (e.g., each keyword standing alone) and on probabilities of "bigrams" (e.g., conditional probabilities between two different keywords). In one example, consider a search of an external knowledge base that provides 100 results, where 80 of the results include the catalog "refrigerator" and 60 of the results include attribute "low energy." The probability of finding the term "refrigerator," p(refrigerator), is 0.8 and the probability of finding the term "low energy," p(low energy), is 0.6. In the 80 results that include "refrigerator," if 50 of the 80 include "low energy," then the bigram of the two terms has a probability, p(refrigerator|low energy), of 50/80=0.625.

Weighting affects these probabilities. For example, a given website may have a higher catalog weight and lower attribute weight, which affect how the results from that website are used. Following the above example, the catalog result of 80 for "refrigerator" may be increased by some amount, while the attribute result of 60 for "low energy" may be decreased, both according to weights associated with the particular external source on which the search is performed.

Block 210 may evaluate the probability for the entire query in different ways. Following the query structure example described above, an exemplary computation of probability for a <brand, catalog, attribute1, attribute2> query would be, e.g., P(catalog,brand,attr1,attr2)=P(catalog) P(brand|catalog)P(attr1|catalog)P(attr2|catalog). The probability for the query as a whole thereby captures contributions from different interactions between the keywords. After evaluating the probabilities for all of the new queries, the query having the highest probability is returned in block 212 to be used to provide results to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
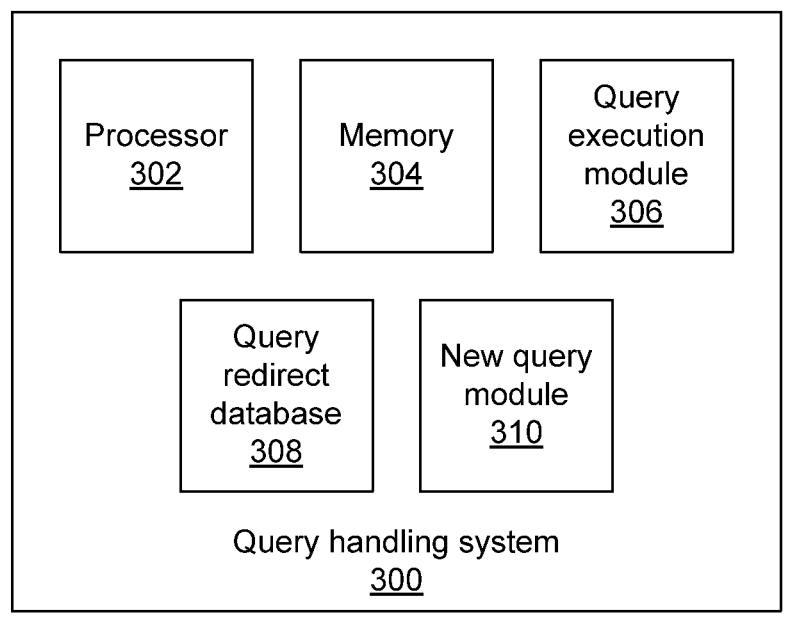
FIG. 3 is a block diagram showing a system for handling a user's query in accordance with the present principles.

Referring now to FIG. 3, a system 300 for query handling is shown. The system 300 includes a hardware processor 302 and memory 304. It should be noted that some functions are described herein as being performed by "modules." These modules may be implemented as software that is stored in memory 304 and executed on processor 302. Alternatively, the modules may instead be implemented as discrete hardware devices such as, for example, an application-specific integrated chip or a field programmable gate array.

A query execution module 306 receives user queries and attempts to execute them. If the query produces no result, the query execution module 306 checks a query redirect database 308 that is stored in the memory 304 for a corresponding success query. The redirect database 308 may be formed from previous no result queries that were converted into success queries and may also include information provided by manufacturers or sellers to indicate known correspondences between product identifiers. If no such entry is found in the query redirect database 308, a new query module 310 builds a set of new queries in accordance with information found in external knowledge bases. The new query is then executed by the query execution module 306 and any results are provided to the user.

The new query module 310 extracts keywords from search results provided by external knowledge bases and forms a set of candidate queries. Each of the candidate queries is formed according to one or more schemas and its probability is compared to the probabilities of the other candidate queries. The candidate query having the highest probability is selected by the new query module 310.

It should be recognized that, with the information provided by the new query, the user can make informed decisions that materially affect their lives. For example, upon finding the item that they sought, the user may purchase that item and cause it to be delivered to them. In one specific example, it is contemplated that a successful query might automatically trigger another action, such as placing an order for an item or otherwise supplying additional information to the user. Such information may be stored in a user profile and used later for improving the user's experience. The above embodiments provide distinct advances in data management, query handling, and searching. In addition, data retrieval is a basic function of a computer, and so an improvement in query handling for data retrieval represents an improvement in the functioning of the computer itself.

Having described preferred embodiments of query handling in search systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for handling queries, comprising:
   extracting keywords related to a first query from one or more information sources;
   classifying the keywords according to a plurality of categories defined by a query schema;
   combining a plurality of the keywords into a second query according to the query schema; and
   executing the second query to generate one or more results.

2. The method of claim 1, further comprising executing the first query and only performing the steps of extracting, classifying, combining, and executing the second query if the first query generates no results.

3. The method of claim 2, further comprising searching a query redirect database for a success query associated with the first query and only performing the steps of extracting, classifying, combining, and executing the second query if no such success query exists.

4. The method of claim 1, further comprising weighting the keywords in accordance with a respective weight associated with each information source.

5. The method of claim 1, wherein combining the plurality of the keywords into the second query comprises forming a plurality of candidate queries.

6. The method of claim 5, wherein combining the plurality of keywords into the second query further comprises calculating a probability for each of the keywords.

7. The method of claim 6, wherein combining the plurality of keywords into the second query further comprises calculating a conditional probability for respective bigrams of keywords.

8. The method of claim 7, wherein combining the plurality of keywords into the second query further comprises multiplying each of the calculated probabilities together to determine an overall probability for each of the candidate queries.

9. The method of claim 8, wherein combining the plurality of keywords into the second query further comprises selecting a candidate query having a highest overall probability as the second query.

10. A computer readable storage medium comprising a computer readable program for handling queries, wherein the computer readable program when executed on a computer causes the computer to perform the steps of claim 1.

11. A method for handling queries, comprising:
    extracting keywords related to a first query from one or more information sources;
    weighting the keywords in accordance with a respective weight associated with each information source;
    classifying the keywords according to a plurality of categories defined by a query schema;
    combining a plurality of the keywords into a second query according to the query schema, comprising:
      forming a plurality of candidate queries;
      calculating a probability for each of the keywords;
      calculating a conditional probability for respective bigrams of keywords;
      multiplying each of the calculated probabilities together to determine an overall probability for each of the candidate queries; and
      selecting a candidate query having a highest overall probability as the second query; and
    executing the second query to generate one or more results.

12. A query handling system, comprising:
    a new query module comprising a processor configured to extract keywords related to a first query from one or more information sources, to classify the keywords according to a plurality of categories defined by a query schema, to combine a plurality of the keywords into a second query according to the query schema; and
    a query execution module configured to execute the second query to generate one or more results.

13. The system of claim 11, wherein the query execution module is further configured to execute the first query and wherein the new query module is configured to only form the second query if the first query generates no results.

14. The system of claim 12, further comprising a query redirect database, wherein the new query module is configured to only form the second query if there is no success query associated with the first query in the query redirect database.

15. The system of claim 11, wherein the new query module is further configured to weight the keywords in accordance with a respective weight associated with each information source.

16. The system of claim 11, wherein the new query module is further configured to form a plurality of candidate queries.

17. The system of claim 15, wherein the new query module is further configured to calculate a probability for each of the keywords.

18. The system of claim 16, wherein the new query module is further configured to calculate a conditional probability for respective bigrams of keywords.

19. The system of claim 17, wherein the new query module is further configured to multiply each of the calculated probabilities together to determine an overall probability for each of the candidate queries.

20. The system of claim 11, wherein the new query module is further configured to select a candidate query having a highest overall probability as the second query.

* * * * *